(12) United States Patent
Kockmann

(10) Patent No.: US 9,302,243 B2
(45) Date of Patent: Apr. 5, 2016

(54) CONTINUOUS REACTION MICRO-REACTOR

(75) Inventor: Norbert Josef Kockmann, Dortmond (DE)

(73) Assignee: LONZA AG, Basel (CH)

( * ) Notice: Subject to any disclaimer, the term of this patent is extended or adjusted under 35 U.S.C. 154(b) by 26 days.

(21) Appl. No.: 12/743,613

(22) PCT Filed: May 12, 2010

(86) PCT No.: PCT/EP2010/056594
§ 371 (c)(1),
(2), (4) Date: Dec. 6, 2011

(87) PCT Pub. No.: WO2010/130808
PCT Pub. Date: Nov. 18, 2010

(65) Prior Publication Data
US 2012/0076705 A1  Mar. 29, 2012

(30) Foreign Application Priority Data

May 12, 2009  (WO) ................. PCT/EP2009/055739

(51) Int. Cl.
*B01J 19/00* (2006.01)

(52) U.S. Cl.
CPC ...... *B01J 19/0093* (2013.01); *B01J 2219/0081* (2013.01); *B01J 2219/0086* (2013.01);
(Continued)

(58) Field of Classification Search
CPC ......... A01N 59/00; A01N 37/16; B01J 19/00; B01J 19/0013; B01J 19/0046; B01J 19/0093; B01J 19/24; B01J 7/00; B01J 8/00; B01J 2523/00; B01J 2219/00783; B01J 2219/00873; B01J 2219/00835; B01J 2219/0086; B01J 2219/00722; B01J 2219/00585; B01J 2219/00094; B01J 2219/00006; B01J 2219/00781; B01J 2219/00786; B01J 2219/00788; B01J 2219/0079; B01J 2219/00792; B01J 2219/00795; B01J 2219/00797; B01J 2219/00799; B01J 2219/00801; B01J 2219/00804; B01J 2219/00806; B01J 2219/00808; B01J 2219/00871; C40B 60/14; C01B 2203/0233; C07C 51/235; C07C 51/265; C07C 19/075; C08G 18/10
USPC .................. 422/129, 130, 600, 603, 630, 198
See application file for complete search history.

(56) References Cited

U.S. PATENT DOCUMENTS

| 4,894,709 | A | 1/1990 | Phillips et al. |
|---|---|---|---|
| 5,580,523 | A | 12/1996 | Bard |

(Continued)

FOREIGN PATENT DOCUMENTS

| DE | 10124501 A1 | 11/2002 |
|---|---|---|
| DE | 10341500 A1 | 3/2005 |

(Continued)

OTHER PUBLICATIONS

EPO Search Report issued in corresponding EPO Patent Application No. 10720905.8 dated Oct. 23, 2015.

*Primary Examiner* — Natasha Young
(74) *Attorney, Agent, or Firm* — Hoffmann & Baron, LLP

(57) ABSTRACT

A continuous reaction micro-reactor of modular structure comprises, arranged along a back-to-front stacking axis thereof, a first frame means, a reaction unit, and a second frame means, wherein said reaction unit comprises a process fluid channel system for continuous reaction of a plurality of feeds or reactants flowing into said reaction unit to form at least one product flowing out of said reaction unit, and a heat exchange fluid channel system for adjusting the temperature environment of said process fluid channel system, said first and second frame means are each formed as a flange, and said first and second frame means are alpressed towards each other by a plurality of tensioning means arranged along and within an outer circumference of said first and second frame means and enclosing said reaction unit.

30 Claims, 18 Drawing Sheets

(52) U.S. Cl.
CPC .............. *B01J2219/00783* (2013.01); *B01J 2219/00835* (2013.01); *B01J 2219/00871* (2013.01); *B01J 2219/00873* (2013.01); *B01J 2219/00889* (2013.01); *B01J 2219/00891* (2013.01)

(56) References Cited

U.S. PATENT DOCUMENTS

| | | | |
|---|---|---|---|
| 6,369,893 | B1 | 4/2002 | Christel et al. |
| 6,857,449 | B1 * | 2/2005 | Chow .......................... 137/833 |
| 7,056,477 | B1 * | 6/2006 | Schwalbe et al. ............ 422/129 |
| 7,473,404 | B2 * | 1/2009 | Chopard et al. ............. 422/605 |
| 7,923,162 | B2 * | 4/2011 | Vanderwees ................. 429/434 |
| 2003/0150806 | A1 | 8/2003 | Hobbs et al. |
| 2003/0159530 | A1 | 8/2003 | Haas et al. |
| 2004/0137299 | A1 * | 7/2004 | Mazza et al. ................... 429/34 |
| 2004/0156762 | A1 | 8/2004 | Schuppich et al. |
| 2005/0207953 | A1 | 9/2005 | Upadhye et al. |
| 2006/0045821 | A1 * | 3/2006 | McKelvy et al. ............. 422/130 |
| 2006/0046113 | A1 | 3/2006 | Wang et al. |
| 2006/0171864 | A1 | 8/2006 | Caze et al. |
| 2007/0077179 | A1 * | 4/2007 | Schmalz ........... B01F 15/00935 422/400 |
| 2009/0047192 | A1 * | 2/2009 | Kihara ................ B01J 19/0093 422/198 |

FOREIGN PATENT DOCUMENTS

| | | |
|---|---|---|
| DE | 202010000262 | 6/2010 |
| EP | 1123735 A2 | 8/2001 |
| EP | 1336432 | 8/2003 |
| EP | 1839739 A1 | 10/2007 |
| EP | 2223741 | 9/2010 |
| GB | 233350 | 10/1925 |
| JP | 2004504932 | 2/2004 |
| JP | 2004531379 | 10/2004 |
| JP | 2005509514 | 4/2005 |
| JP | 2005132712 | 5/2005 |
| JP | 2005254194 | 9/2005 |
| JP | 2008132444 | 6/2008 |
| WO | 0141916 A1 | 6/2001 |
| WO | 0189681 A2 | 11/2001 |
| WO | WO0218042 | 3/2002 |
| WO | 02064247 A1 | 8/2002 |
| WO | WO03043730 | 5/2003 |
| WO | WO2004103539 | 12/2004 |
| WO | WO2005080901 | 9/2005 |
| WO | WO2007050013 | 5/2007 |
| WO | 2007112945 A1 | 10/2007 |
| WO | WO2007142983 | 12/2007 |

* cited by examiner

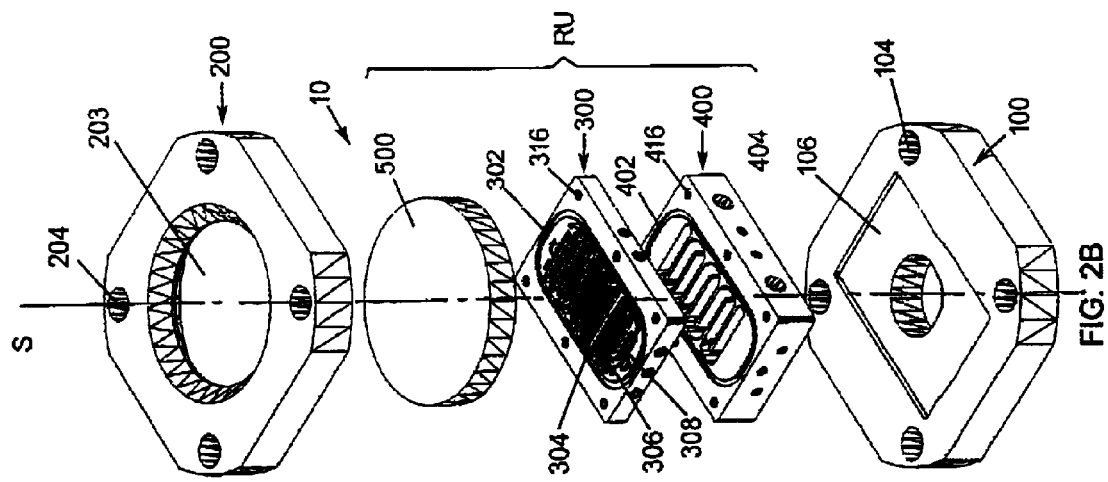
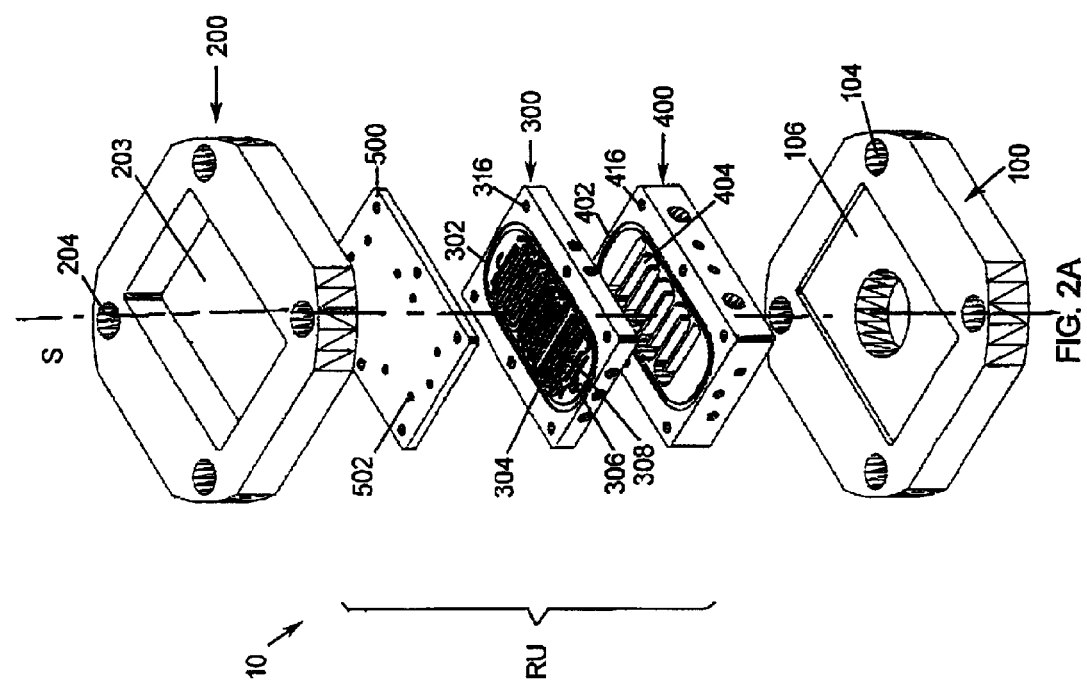

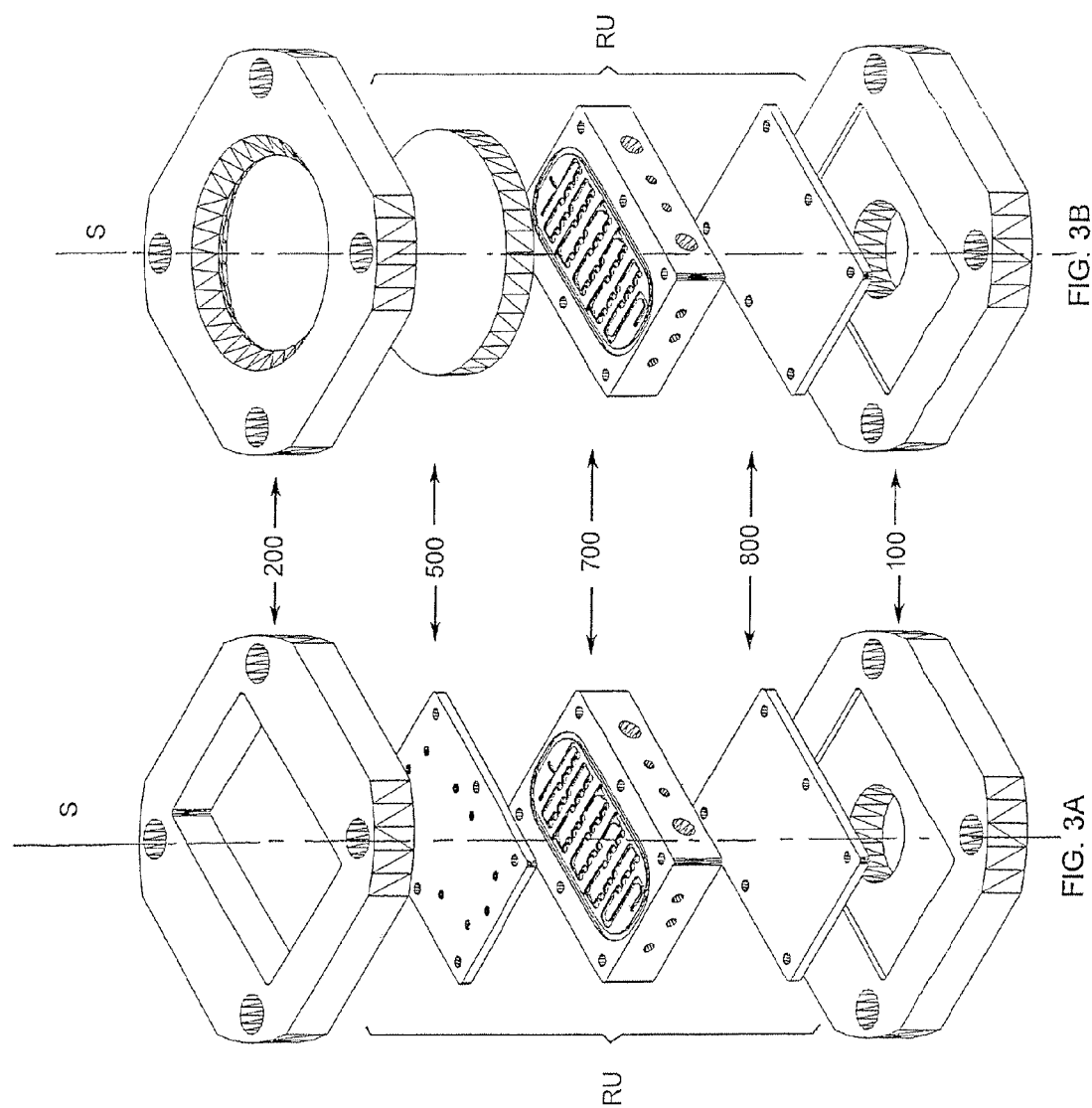

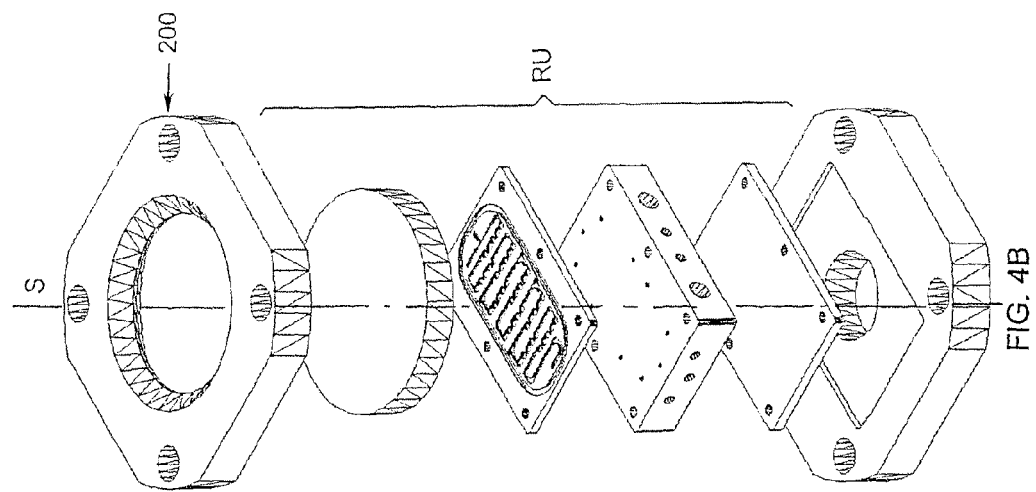
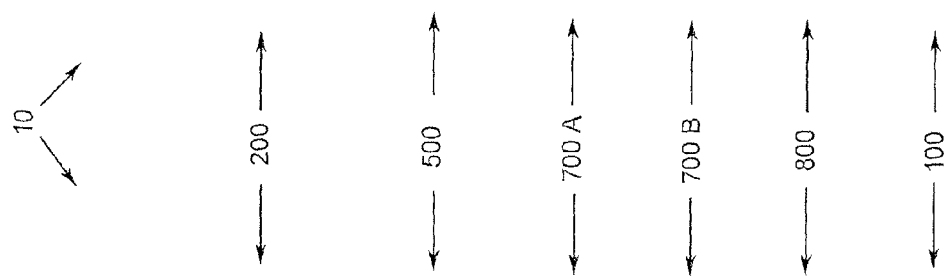
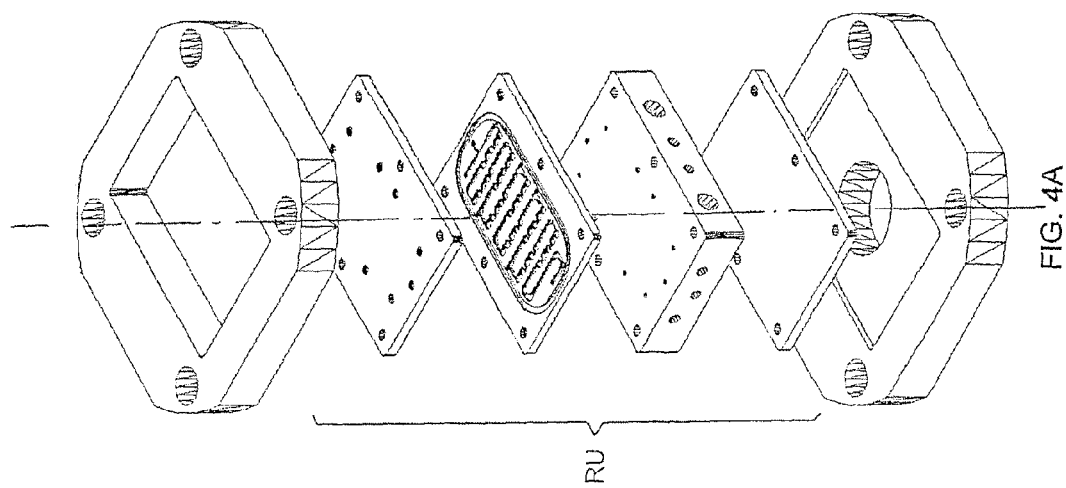

CONTINUOUS REACTION MICRO-REACTOR

This application is the U.S. National Phase of, and Applicant claims priority from, International Patent Application Number PCT/EP2010/056594, now WO 2010/130808, filed 12 May 2010 and International Patent Application No. PCT/EP2009/055739 filed 12 May 2009 which are incorporated herein by reference in their entirety.

BACKGROUND OF THE INVENTION

The present invention refers to a continuous reaction micro-reactor, specifically to a continuous micro-reactor of modular structure.

In continuous reaction technology, a plurality of feeds or reactants continuously flowing into a reactor or micro-reactor chemically interact therein to form a product that continuously flows out of it. Within the reactor, there is provided a process fluid channel system bringing together, mixing and swirling the plurality of feeds embedded in an optimum reaction environment, especially a characteristic temperature regime, for the chemical reactions to take place. The process fluid channel system may be divided into at least one turbulent-flow mixing zone and at least one essentially laminar-flow retention zone that are appropriately arranged in series. In case of more than one mixing zone and/or retention zone, they are concatenated in a suitable manner. In order to establish a well determined temperature regime, a heat exchange system, for example in the form of channels, is generally integrated.

A micro-reactor of the above described type is disclosed, for example, in EP 1 839 739 A1, which is a modular micro-reactor comprising a plurality of process modules and heat exchange modules arranged to form a stack. The process modules are connected externally to produce a large or long flow-channel system by adding the individual sub-systems, and due to the heat exchange modules, a section-wise heating or cooling of the chemical substances (reactants, product) flowing in the flow-channel system is achieved (using in this paragraph the terminology applied in document EP 1 839 739 A1 which is not always identical to the one used herein).

The development of such reactors is a sophisticated task that even nowadays can not satisfactorily be solved by computer simulation, requiring supplemental experimental studies to propel progress in the field.

An object of the present invention is to provide a laboratory-size micro-reactor for in situ research of continuous reaction technology that enables researchers to get a deeper understanding of the fluid dynamics involved that may later be scaled-up to industrial size.

SUMMARY OF THE INVENTION

This object is achieved by the features of claim 1.

The present invention (claim 1) refers to a continuous reaction micro-reactor (a) of modular structure comprising, arranged along a back-to-front stacking axis thereof, a first frame means, a reaction unit, and a second frame means, wherein (b) the reaction unit comprises a process fluid channel system for continuous reaction of a plurality of feeds or reactants flowing into the reaction unit to form at least one product flowing out of the reaction unit, and a heat exchange fluid channel system for adjusting the temperature environment of the process fluid channel system, (c) the first and second frame means are each formed as a flange, and the first and second frame means are pressed towards each other by a plurality of tensioning means arranged along and within an outer circumference of the first and second frame means and enclosing the reaction unit (cf. FIG. 1 for an exemplary visualization of the subject-matter defined in claim 1).

Comments to (a): Modularity of the inventive micro-reactor means that all structural components—each of the flanges as well as the reaction unit—can separately be exchanged to adapt it to multifarious technological problems to be investigated and solved. To this end, for example, the reaction unit can be substituted by another one of different type and/or complexity of the process fluid channel system and/or heat exchange fluid channel system for running different chemical reactions or using feeds flowing into the reaction unit having varying physical properties (viscosity, temperature and/or pressure behaviour, Reynolds number etc.).

The term "back-to-front axis" defines back and front surfaces of each element or entity forming the micro-reactor. In addition, the term "flange" is to be understood as a connecting or fastening means that essentially extends in a plane perpendicular to the back-to-front axis, and centered with respect to that axis, so that the back-to-front axis may be regarded as an axis of symmetry. The flange, furthermore, has the shape of a circular ring or a shape that is homeomorph to that of a circular ring (the inner and outer circumferences may be, for example, squares or rectangles; in this case, the corners may be rounded or not rounded).

Comments to (b): There is no principle restriction as for the special relationship of the process fluid channel system and the heat exchange fluid channel system with respect to each other or the first and second frame means, as long as the heat exchange between them is sufficient to provide the temperature environment necessary for the chemical reactions to take place between the various feeds or reactants, i. e. the various chemical substances interacting within the micro-reactor, within the process fluid channel system. Preferably, however, one of the channel systems extends in a plane A, and the other one of the channel systems extends in a plane B, where planes A and B are parallel to each other. Most preferably, the channel systems are at least in sections congruently formed, so that heat transfer is optimized. The channel systems can, for example, be created by manufacturing the reaction unit by means of an appropriate casting technology. Advantageously, corresponding inlet and outlet ports are provided at side surfaces of the reaction unit, as visualized in FIG. 1.

Comments to (c): According to the invention, there is defined a space—limited by the flange-shaped first and second frame means and by planes defined by axes of respective two adjacent ones of the plurality of tensioning means connecting the first and second frame means—in which the reaction unit is arranged. Advantageously, as shown in FIG. 1, said tensioning means are equidistantly spaced and do not completely enclose or encase the reaction unit in order to allow access to side surfaces of the reaction unit from the outside the micro-reactor to be able to establish necessary connections between the reaction unit and external units (fluid providing units, pumps, measurement apparatuses, etc.). Preferably, inlet and outlet ports forming an interface between flexible external conduct systems (e. g. said external units) and the process fluid channel system and/or heat exchange fluid channel system are arranged within said space, in order to provide optimum mechanical protection for the reaction unit. According to the present invention, the tensioning means are arranged along and within an outer circumference of the first and second frame means. That is, the maximum extension of the inventive micro-reactor in a plane perpendicular to the stacking axis is essentially given by the first and second frame means mechanically protecting all other components.

To summarize, the inventive micro-reactor has the following three main advantages: (1) it is modularly designed, (2) its reaction unit is mechanically protected by the first and second frame means and the tensioning means, and (3) its process fluid and heat exchange fluid channel systems are easily accessible from the outside.

According to a preferred aspect of the present invention (claim 2), the reaction unit comprises a process and heat exchange module, and a cover-plate sandwiched between the process and heat exchange module and the second frame means. First of all, as mentioned above modularity according to the present invention means that each of the process and heat exchange module and the cover-plate can be separately exchanged. Furthermore, the cover-plate serves as sealing means for sealing the process fluid channel system that is formed or worked into a front surface of the process and heat exchange module. That is, without the cover-plate, the channels forming the process fluid channel system are open grooves of various thickness and/or depth easily formed by some micro-machining technology like milling. The open grooves are then fluid-tightly covered and closed by the cover-plate, leaving inlet and outlet openings for the various feeds and products at side surfaces of the reaction unit.

According to a preferred aspect of the present invention (claim 3), the process and heat exchange module comprises plate-shaped sub-modules, a process sub-module and a heat exchange sub-module, continuing the inventive modular concept defined in claims 1 and 2. The combination of cover-plate and process sub-module is equivalent to the combination of process sub-module and heat exchange sub-module regarding the manufacturing and sealing of the respective channel systems; both the process fluid channel system and the heat exchange fluid channel system face towards the second frame means and are covered in a manner to be sealed by a back surface of the adjacent module/plate directly in front of it.

According to a preferred aspect of the present invention (claim 4), the heat exchange sub-module and the first frame means are made of one part. This feature may be interpreted at first glance as a departure from the modularity concept because the functions of two structural components are integrated into a single element. However, a sufficient heating and/or cooling effect is possible to be achieved for a plurality of different process fluid channel systems by a same heat exchange fluid channel system, provided the channels of the heat exchange fluid channel system are appropriately designed. That is, a single "heat exchange sub-module—first frame means—integrated element" as defined in claim 4 may be compatible with more than one process fluid channel system and chemical reactions taking place therein. Thus, what at first glance appears to be a decrease in modularity actually emphasizes the independent exchangeability of the sub-modules/plates. In addition, manufacturing the heat exchange sub-module and the first frame means of one part reduces manufacturing costs.

According to a preferred aspect of the present invention (claim 5), the process and heat exchange module comprises a plate-shaped process and heat exchange sub-module and a second cover-plate, continuing thereby the inventive modular concept defined in claims 1 and 2. The difference between the structure defined in claim 3, where the process and heat exchange module comprises essentially equivalent sub-modules in a sense that each one is provided with a channel system formed in its front surface, is that the process and heat exchange module here comprises (i) a first sub-module that includes both the process fluid channel system (worked into its front surface) and the heat exchange fluid channel system (worked into its back surface), and (ii) a second cover-plate. This has the advantage that any process and heat exchange sub-module can be designed as an optimum adaptation of both channel systems. That is, in practice, specific chemical reactions to be studied by means of the inventive micro-reactor require—to achieve best results—a specific type of process fluid channel system, which in turn requires—again in order to achieve best results—a specific type of heat exchange fluid channel system. Due to the structure according to the present aspect, the choice of the process fluid channel system automatically provides the best heat exchange fluid channel system.

According to a preferred aspect of the present invention (claim 6), the process and heat exchange sub-module is further divided into plate-shaped sub-module bodies, a first sub-module body including the process fluid channel system and a second sub-module body including the heat exchange fluid channel system. Therefore, the division to ever smaller "main" entities (i. e. disregarding elements like inlet and outlet ports etc.) is: reaction unit→module→sub-module→sub-module body. According to the present aspect, the reaction unit is divided into four main entities, or the micro-reactor is divided into six main entities. It should be noted that the entities can also be differently grouped. That is, after having prepared the heat exchange fluid channel system, for example, the heat exchange sub-module body can be connected with the second cover-plate to form a second heat exchange module (comparable with the heat exchange module defined in claim 3 but having a closed channel system that does not need an additional surface to be sealed).

According to a preferred aspect of the present invention (claim 7), the second cover-plate and the first frame means are made of one part. Here, it is referred to the considerations to claim 4 above.

According to a preferred aspect of the present invention (claim 8), the second frame means is configured such as to allow the process fluid channel system to be inspected via the cover-plate being transparent. This inspection enables the in situ observation of the flow behaviour of the feeds continuously flowing into the reactor to chemically react therein thereby forming a mixture comprising a product continuously flowing out of the reactor as well as the evaluation of deposits when the micro-reactor is "switched off" after a predetermined period of time. The feeds independently of each other can be either liquid or gaseous, only depending on the envisaged reaction. Since the flow of the feeds, especially through a mixing zone of the process fluid channel system, is chaotic and depends on many parameters like their viscosities which in turn depend on the temperature they are subject to, the flow speed which in turn for a specific geometry (shape, size) of the process fluid channels depends on the inlet pressure, said geometry, the reaction kinetics of the feeds etc., an observation is often preferred to computer simulation, or at least these computer simulations have first of all to be fed by experimental data gained in this way. Therefore, the option to be able to observe the flow of the chemical substances (feeds/reactants and product/products) in developing the design of the process fluid channel system is an invaluable asset. The cover-plate in this aspect of the present invention may either be completely transparent, made from glass or plastics, for example, or have a suitably arranged portion of such a material. Advantageously, colourless feeds may be dyed in order to be able to observe the mixing process thereof. Preferably, chemical substances not reacting with the feeds are added that show a colour change characteristic of their temperature. For example, pH indicators and a neutralization reaction can indicate the mixing process along the channel length. Besides the observation with the naked-eye, observation can also be carried out with suitable instruments like a spectrometer or/and various filters to get informations about the processes that occur within the process module (UV, IR, Raman).

According to a preferred aspect of the present invention (claim 9), the second frame means has a window allowing said inspection. The window can be of any appropriate shape, especially of circular or rectangular shape, and is ideally centered on the stacking axis.

According to a preferred aspect of the present invention (claim 10), instead of being transparent, the cover-plate may be configured such as to allow an external fluid connection of the cover-plate through the second frame means to serve as a fluid inlet means for said process fluid channel system. This has the advantage of being able to couple additional feeds into the process fluid channel system via the front surface of the cover-plate, so that locations where the feeds are coupled in are not restricted to the side surfaces of the reaction unit. Furthermore, the channels connecting the process fluid channel system with the outside can be made shorter.

According to a preferred aspect of the present invention (claim 11), the surface of the cover-plate directly covering the process fluid channel system carries a catalytic coating. The catalytic coating may be applied only in regions where the cover-plate is in contact with the chemical substances flowing in the process fluid channel system. As a modification of a catalytic coating being made of a single catalytic substance, the catalytic coating may be made of different catalytic substances depending on the position thereof with respect to the process fluid channel system in the assembled stated of the cover-plate and the reaction unit. Alternatively or additionally, catalytic substances can be directly inserted into the reaction channels in the form of micro pellets or raschig rings.

According to a preferred aspect of the present invention (claim 12), the process fluid channel system has a plurality of primary inlet ports for a plurality of primary feeds flowing into the process module, and at least one secondary inlet port provided after said plurality of primary inlet ports in a flow direction of the chemical substances for at least one secondary feed stream flowing into the process module. Consequently, complex chemical reactions can be observed to take place along the process fluid channel system where, for example, a first reaction is initiated by mingling two primary substances to form a first (intermediate) product, and then a secondary feed stream is added and mixed with the first (intermediate) product to form a second intermediate product etc. Each time, a secondary feed is added, it is advantageously mixed with the respective produce previously formed. Alternatively, each addition of the secondary feed reacts with a certain amount of the first feed as it is disclosed in the description of EP 1 839 739 A1 using a multi injection module.

According to a preferred aspect of the present invention (claim 13), the primary and/or secondary inlet ports are arranged on side surfaces and/or on front and back surfaces of the reaction unit. Arranging the inlet ports at a side surface enables a compact and space saving design with the disadvantage that the feeds can not be supplied at every position of the process fluid channel system with equal ease, especially when there is less space between structure elements (windings) building-up the process fluid channel system. Things are reversed by arranging the inlet ports on front and/or back surfaces of the reaction unit. Ideally, both advantages can be obtained by a less dense process fluid channel system where the supply or feeding channels can be established to be connected to any point of the process fluid channel system.

According to a preferred aspect of the present invention (claim 16), the first and second frame means of the continuous reaction micro-reactor have first and second positioning means, respectively, that define a position of the heat exchange module and the process module relative to the stacking axis. Due to these positioning means, which according to a preferred aspect of the present invention (claim 17) are formed as recesses in the surfaces of the first and second frame means, respectively, the modules building up the micro-reactor are exactly and definitely positionable. That is, all elements to be adapted to be exchanged in this modification have outer dimensions commensurate to inner dimensions of the recesses formed in the respective frame means, so that the assembly thereof is alleviated and their relative position unambiguous.

The structure of the main aspects of the present invention as defined in some of the claims, whose subject-matter is commented above, is shown in FIG. 18.

BRIEF DESCRIPTION OF THE DRAWINGS

The foregoing and further objects, features and advantages of the invention will become apparent from the following description of preferred embodiments with reference to the accompanying drawings. In the drawings are:

FIGS. 2A and 2B schematic exploded perspective views of two variants of a continuous reaction micro-reactor according to a second embodiment of the present invention;

FIGS. 3A and 3B schematic exploded perspective views of two variants of a continuous reaction micro-reactor according to a third embodiment of the present invention;

FIGS. 4A and 4B schematic exploded perspective views of two variants of a continuous reaction micro-reactor according to a fourth embodiment of the present invention;

FIGS. 16A and 16B schematic perspective views of an assembled micro-reactor according to the present invention, wherein FIG. 16B shows an enlarged view of the process fluid channel system visible in FIG. 16A through the second frame means;

DETAILED DESCRIPTION OF THE INVENTION

Figure 1:
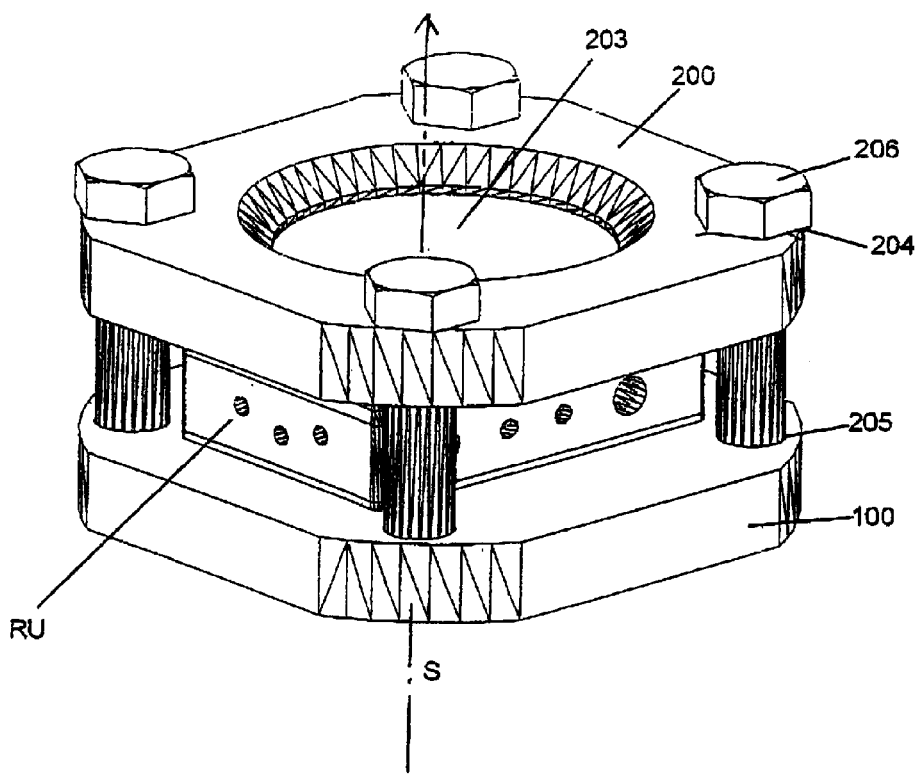
FIG. 1 a schematic perspective view of an assembled continuous-reaction micro-reactor according a first embodiment of the present invention.

FIG. 1 shows a schematic perspective view of an assembled continuous-reaction micro-reactor 10 according a first embodiment of the present invention. According to FIG. 1, the micro-reactor 10 comprises—arranged along a back-to-front stacking axis S (where the direction from back to front is indicated by an arrow on top of the stacking axis S)—a first frame means 100, a reaction unit RU, and a second frame means 200. The first and second frame means 100, 200 each are formed as a flange and are pressed towards each other by four bolts 206 extending through holes 204 in the second frame means 200 and screwed into four threaded holes 205, respectively, arranged along and within an outer circumference of the first and second frame means 100 and 200, respectively. As shown in FIG. 1, the axes of every two adjacent bolts 206 define a plane, resulting in a total of four planes that, together with the first and second frame means 100, 200, confine or define a space in which the reaction unit RU is arranged. Specifically, the first frame means 100 is pressed by the bolts 206 from below against the reaction unit RU, whereas the second frame means 200 is pressed by the bolts 2006 from above against the reaction unit RU by a well defined pressing force. The reaction unit RU comprises a process fluid channel system for continuous reaction of a plurality of feeds or reactants flowing into said reaction unit RU to form at least a product flowing out of the reaction unit RU, and a heat exchange fluid channel system for adjusting the temperature of the process fluid channel system. Although none of the channel systems is explicitly shown in FIG. 1, inlet and outlet openings forming the respective ends of the channel systems for the feeds and the product(s) are visible at side surfaces of the reaction unit RU. The inlet and outlet openings may receive inlet and outlet ports to be connected in turn to appropriate (flexible or non-flexible) conducts that connect the reaction unit RU to external units (feed supply units, pumps, measurement apparatuses, etc.) between respective two of the bolts 206.

FIG. 2A shows a schematic exploded perspective view of a continuous reaction micro-reactor 10 of modular structure according to a second embodiment of the present invention. In the micro-reactor 10 of the second embodiment, the reaction unit RU of the first embodiment is divided—along the back-to-front stacking axis S—into a heat exchange sub-module 400, a process sub-module 300, and a cover-plate 500, both sub-modules 300, 400 and the cover plate 500 being sandwiched between and fluid-tightly pressed together by the first and second frame means 100, 200.

The first and second frame means 100, 200 are formed as rectangular flanges and include four threaded holes 104 and through holes 204, respectively, which are equidistantly arranged with respect to and around the stacking axis S and which receive the bolts 206 (cf. FIG. 1) used to press the sub-modules 300 and 400 and the cover-plate 500 together to form a fluid tight entity referred above as reaction unit RU. The second frame means 200 has a rectangular opening 203 centered with respect to the stacking axis S and allowing therethrough a connection of a process fluid channel system 304 formed in the front surface of the process sub-module 300 to external units via holes 502.

The first frame means 100 has a rectangular recess 106 in which the heat exchange sub-module 400 snugly fits. The recess 106 serves as the inventive positioning means and may, alternatively, be formed also or exclusively in the second frame means 200.

Furthermore, the first and second frame means 100, 200 may be formed from any suitable material, e.g., aluminum, stainless steel, etc., which assures the necessary dimensional stability of the micro-reactor 10.

As shown in FIG. 2A, the process sub-module 300 and the heat exchange sub-module 400 are each of plate-shaped form and comprise an annular groove 302 and 402, respectively, to house a respective O-ring sealing (not shown), so that in the assembled state of the micro-reactor 10, the process sub-module 300 compresses the sealing housed in the groove 402 of the heat exchange sub-module 400 to form a sealed compartment of a heat exchange fluid channel system 404 that is provided within the heat exchange sub-module 400. Similarly, in the assembled state of the micro-reactor 10, the cover-plate 500 compresses the sealing housed in the groove 302 of the process sub-module 300 to form a sealed compartment of a process fluid channel system 304 that is provided within the process sub-module 300. It should be noted that the O-ring sealing is merely a measure of safety to assure leak tightness both of the process sub-module 300 and the heat exchange sub-module 400, and that the contact surfaces of the cover-plate 500 (back surface) and the process sub-module 300 (front surface), as well as the contact surfaces of the process sub-module 300 (back surface) and the heat exchange sub-module 400 (front surface) each have a roughness depth equal to or smaller than 1 μm. Therefore, the cover-plate 500 and the process sub-module 300 prevent fluids flowing in the respective channel system they cover to leave this channel system ("to spill over") by the mere pressure contact; no further sealing is necessary. It should, furthermore, be noted that in case of the heat exchange sub-module 400, in which no chemical reactions take place, the corresponding contact surfaces do not have to be of the above mentioned high quality, because it actually does not matter whether some of the heat exchange fluid "spills over" from one part of the heat exchange fluid channel to another part thereof.

In the first embodiment shown in FIG. 2A, in the assembled state of the micro-reactor 10, the process sub-module 300 and the heat exchange sub-module 400 are in direct thermal contact. In particular, for optimal heat transfer the course of the meander of the process fluid channel system 304 of the process sub-module 300 is aligned with respect to the heat exchange fluid channel system 404 of the heat exchange sub-module 400.

As can be seen from FIG. 2A, both the heat exchange fluid channel system 404 that is provided within the heat exchange sub-module 400 as well as the process fluid channel system 304 that is provided within the process sub-module 300 are formed as meandered grooves so as to extend within the respective groove 302, 402. Furthermore, both the heat exchange sub-module 400 and the process sub-module 300 have bores 316, 416 that match with each other in the stacking direction S, for housing bolts (not shown) connecting detachably and tightly the heat exchange sub-module 400 and the process sub-module 300 with each other. The thus connected heat exchange sub-module 400 and the process sub-module 300 may be considered to form a unit that is clamped between the first frame means 100 and cover-plate 500 attached to the second frame means 200.

In the first embodiment shown in FIG. 2A, the heat exchange sub-module 400 is arranged so that the heat exchange fluid channel system 404 incorporated therein faces towards and is sealed by the process sub-module 300, whereas the process sub-module 300 is arranged so that the process fluid channel system 304 incorporated therein faces towards and is sealed by the cover-plate 500.

In FIG. 2B, there is shown an alternative structure that is identical to the structure of FIG. 2A except for the cover-plate 500 and the second frame means 200. In the structure shown in FIG. 2B, the cover-plate is formed of a transparent material, e. g. glass, and the shapes of the opening 203 and the cover-plate 500—which are of rectangular shape and adapted to each other in FIG. 2A—are of circular shape and adapted to each other in FIG. 2B. This allows observation of the processes (flowing, mixing, reaction) taking place in the process fluid channel system 304 of the process sub-module 300. It should be noted that the circular shape of the transparent cover-plate 500, due to the very high working pressures applied to the feeds flowing in the process fluid channel system, is advantageous in order to reduce the mechanical stress the transparent cover-plate 500 is objected to. Regarding the rectangular cover-plate 500 of FIG. 2A, both its thickness and its material can appropriately and more freely be chosen. As stated above, the shape of the opening 203 in the second frame means is not restricted by the high pressure.

FIGS. 3A and 3B schematically show exploded perspective views of two variants of a continuous reaction microreactor according to a third embodiment of the present invention. FIGS. 3A and 3B again differ in that in the former, the cover-plate 500 is of rectangular shape and not transparent, whereas in the latter, the cover-plate 500 is of circular shape and transparent. The remaining details are identical with those shown in FIGS. 2A and 2B, respectively.

As shown in FIGS. 3A and 3B, the process sub-module 300 and the heat exchange sub-module 400 of FIGS. 2A and 2B, respectively, are combined to form a process and heat exchange sub-module 700. An equivalent way to put it—referring again to the second embodiment—is to say that (a) the heat exchange fluid channel system 404 is moved from the front surface of the heat exchange sub-module 400 to the back surface of the process sub-module 300, and (b) the heat exchange sub-module 400 is converted into a second cover-plate 800, as shown in FIG. 3A. That is, the total number of sub-modules and plates is unchanged.

FIGS. 4A and 4B schematically show exploded perspective views of two variants of a continuous reaction microreactor according to a fourth embodiment of the present invention. The fourth embodiment differs from the third embodiment in that—referring to the third embodiment—the process and heat exchange sub-module is split into a first plate-shaped sub-module body including the process fluid channel system 304, and second plate-shaped sub-module body including the heat exchange fluid channel system 304. An equivalent way to put it—referring again to the second embodiment—is to say that (a) the heat exchange fluid channel system 404 is moved from the front surface of the heat exchange sub-module 400 to the back surface of the second plate-shaped sub-module body inserted between the heat exchange sub-module 400 and the process sub-module 300.

Figure 5:
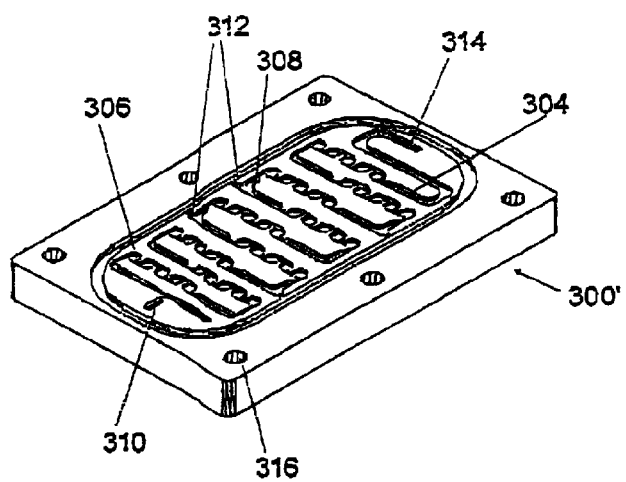
FIG. 5 a schematic perspective view of a module showing details of a specific type of process fluid channel system according to the present invention.

As shown in more detail in FIG. 5, the process fluid channel system 304 is divided into turbulent-flow mixing zones 306 and essentially laminar-flow retention zones 308 that are concatenated alternately. At an inlet side of this concatenation, there are formed a plurality of primary inlet ports 310, and at an outlet side of this concatenation, there is formed an outlet port 314. Between the inlet and the outlet sides of the concatenation, specifically at the connection between a mixing zone and a retention zone, there are provided secondary inlet ports 312 where, as described above, secondary feeds (chemical substances) can be introduced into the process fluid channel system. As shown in FIGS. 1 to 4B, the inlet ports 310, 312 and the outlet port 314 are formed to open on side surfaces of the reaction unit RU, whereas according to an alternative construction (process sub-module 300'), the inlet ports 310, 312 and the outlet port 314 are arranged within the annular groove 302.

FIGS. 6 to 15 show variations of the process fluid channel system 304 of the inventive process sub-module 300' shown in FIG. 5, where in each variation the inlet and outlet ports are arranged within the groove 302 and open to the side of the front or back surface (upper or lower surface in FIG. 5 and plane of projection in FIGS. 6 and 15), the groove 302 dividing the front surface of the process module 300' in an inner area, where the process fluid channel system 304 is arranged, and in an outer area, where the bores 316 for fixing the process sub-module 300' and the heat exchange sub-module 400 to one another are arranged.

The process fluid channel system 304 shown in FIGS. 6 to 8 and 11 to 15 comprise each a plurality of primary inlet ports 310 located at the entrance into the process fluid channel system 304 (left side in FIG. 6, for example), one outlet port 314 located at the exit of the process fluid channel system 304 (right side in FIG. 6, for example), and one or more secondary inlet ports 312 between the primary inlet ports 310 and the outlet port 314. Therefore, in a general flow direction, which is from left to right in FIG. 6 as an example, the process fluid channel system 304 may be regarded as being divided into mixing sections $A_i$ (with i=4 in FIG. 6) comprising each at least one turbulent-flow mixing zone 306 and/or at least one laminar-flow retention zone 308, wherein each connection point where the exit of section $A_i$ is connected to the entrance of section $A_{i+1}$ is formed as a secondary inlet port 312. Therefore, at the connection point between sections $A_i$ and $A_{i+1}$, there may be added a further reactant $R_j$ to the intermediate product $P_i$ produced by chemical reactions in section $A_i$.

Figure 6:
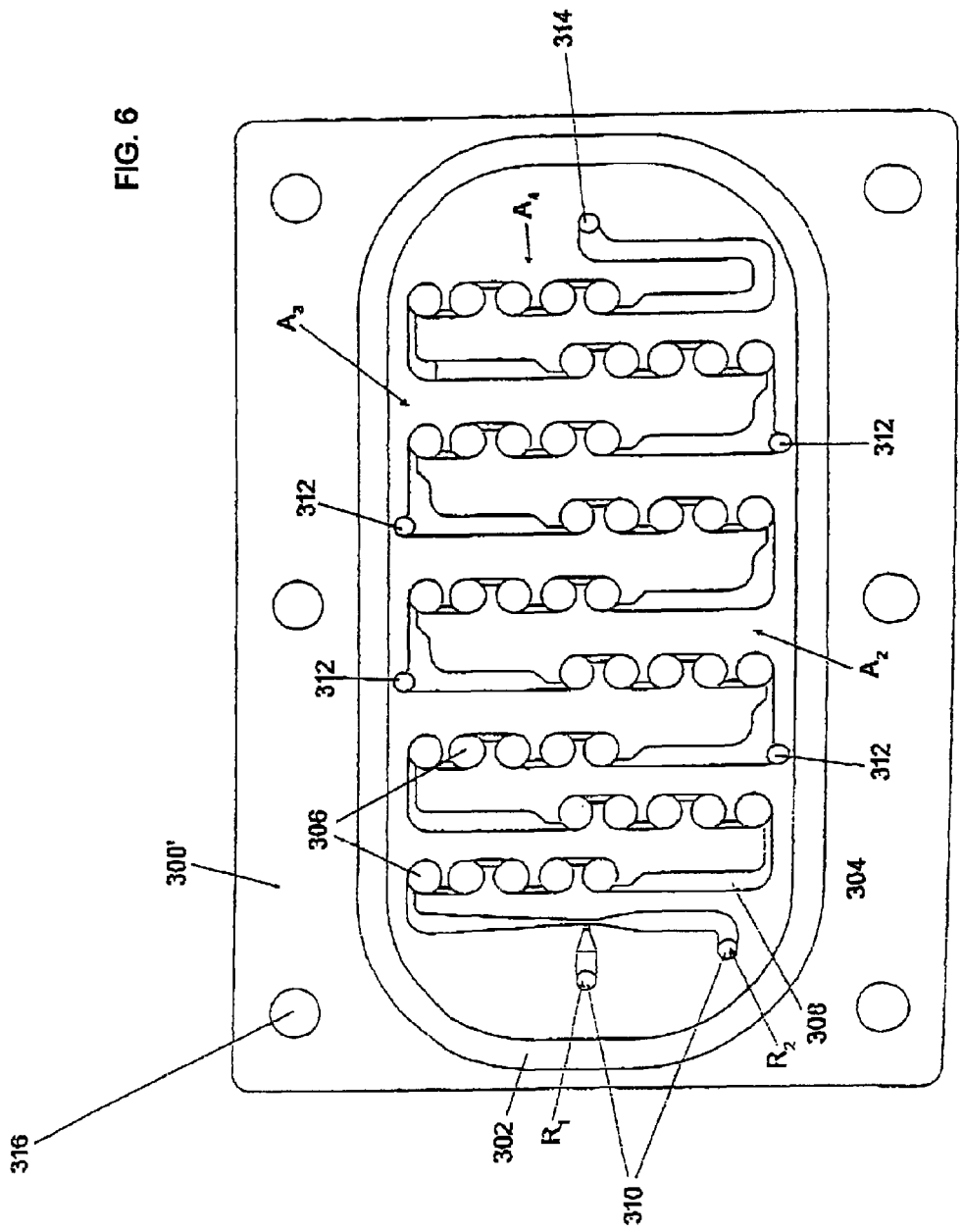
FIGS. 6 to 15 variations of the process fluid channel system according to the present invention.
Figure 7:
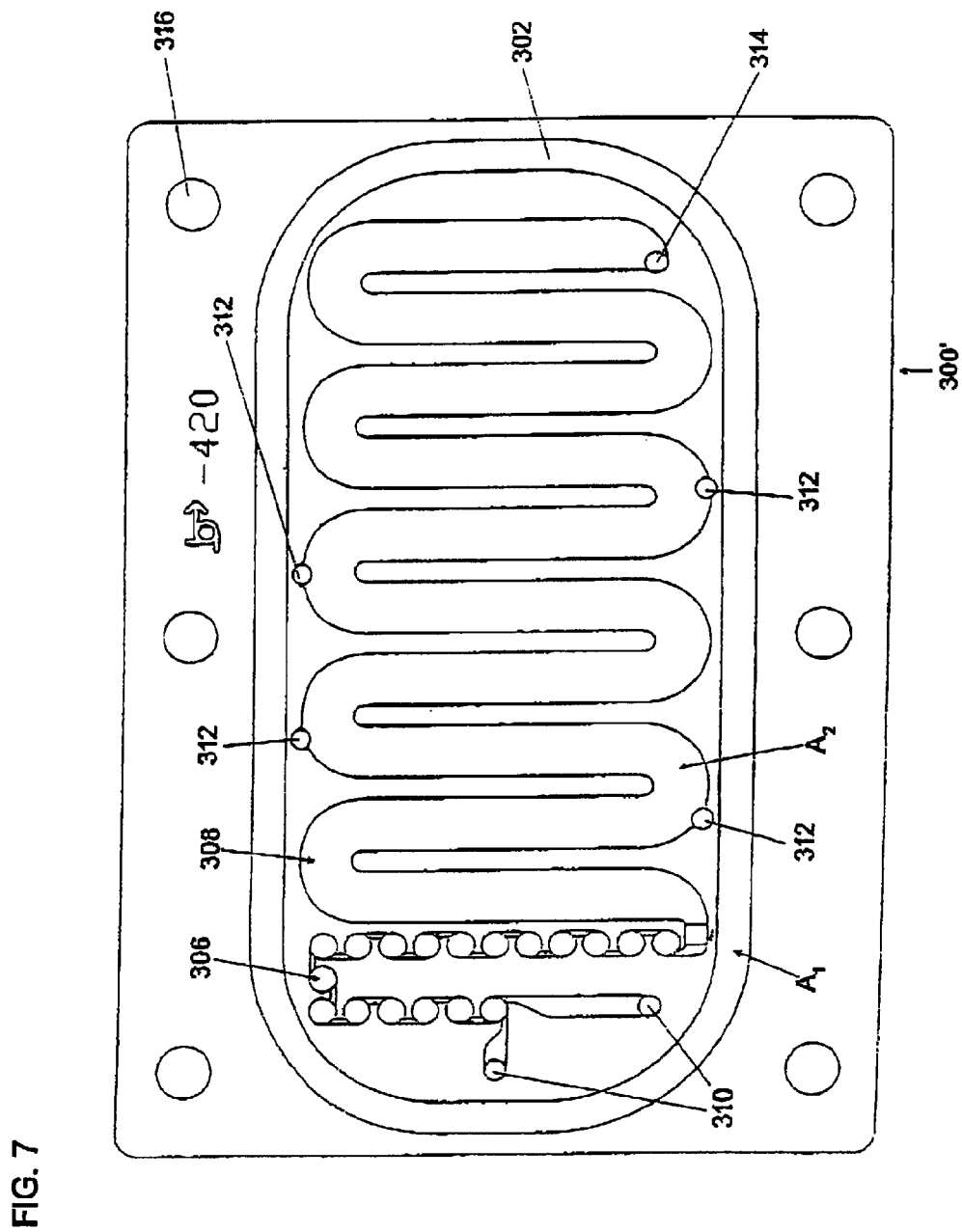

For example, the process module 300' of FIG. 6 comprises two primary inlet ports 310 for reactants $R_1$ and $R_2$ that react in section $A_1$ to a first intermediate product $P_1$. At the first secondary inlet port 312, where sections $A_1$ and $A_2$ are connected, a further reactant $R_3$ may be added to produce a second intermediate product $P_2$, and so on until a (final) product $P_4$ flows out of the process module 300' at the outlet port 314.

Figure 8:
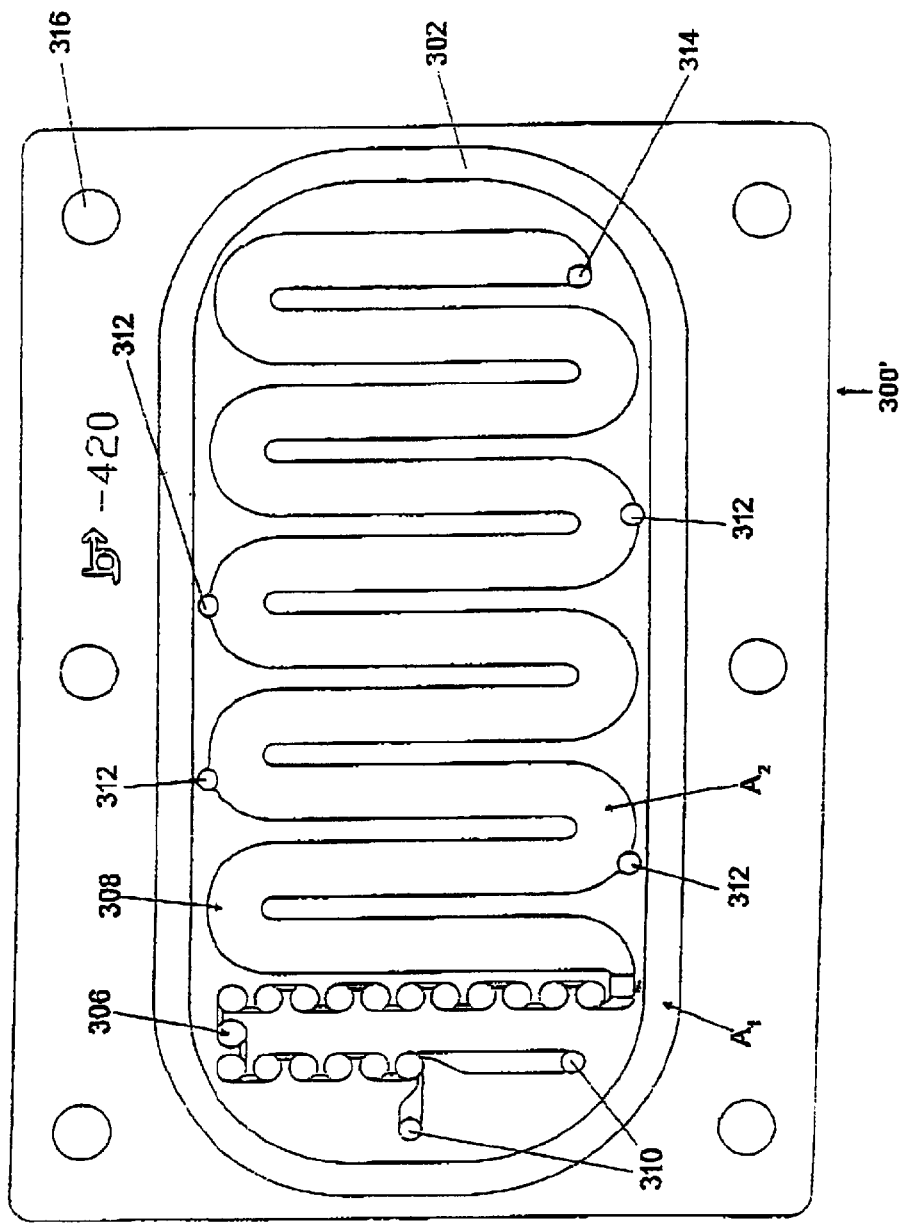
Figure 9:
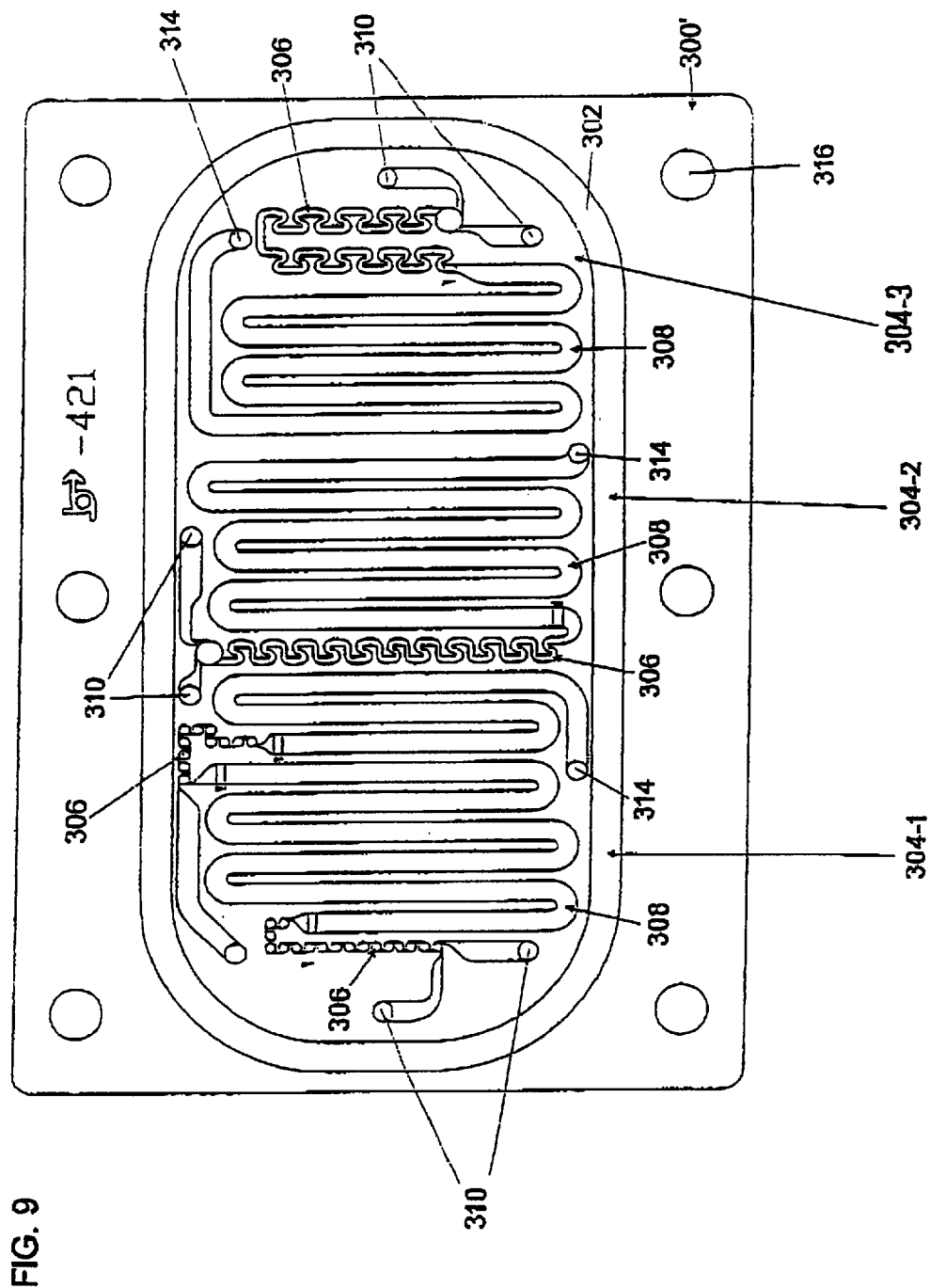
Figure 10:
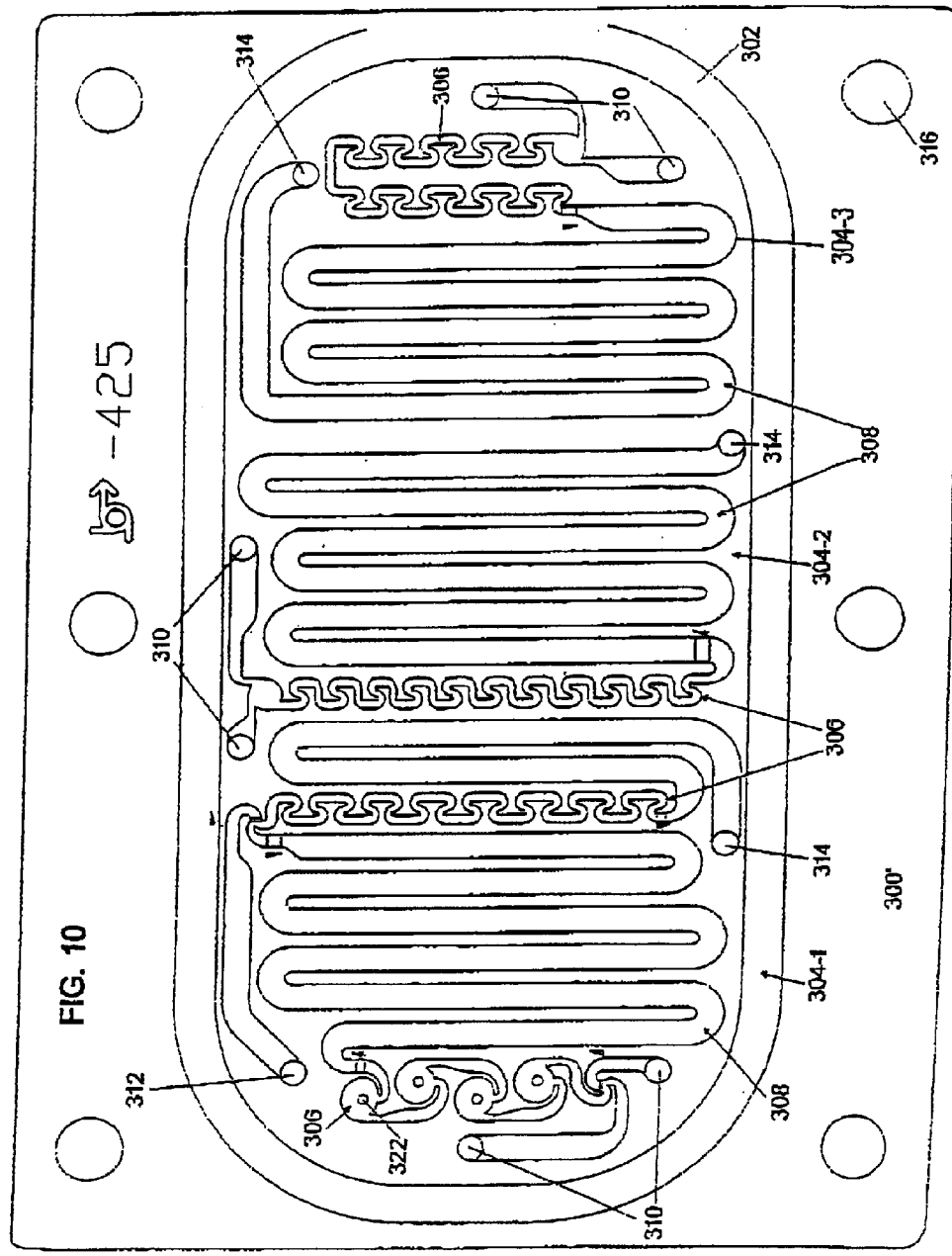
Figure 11:
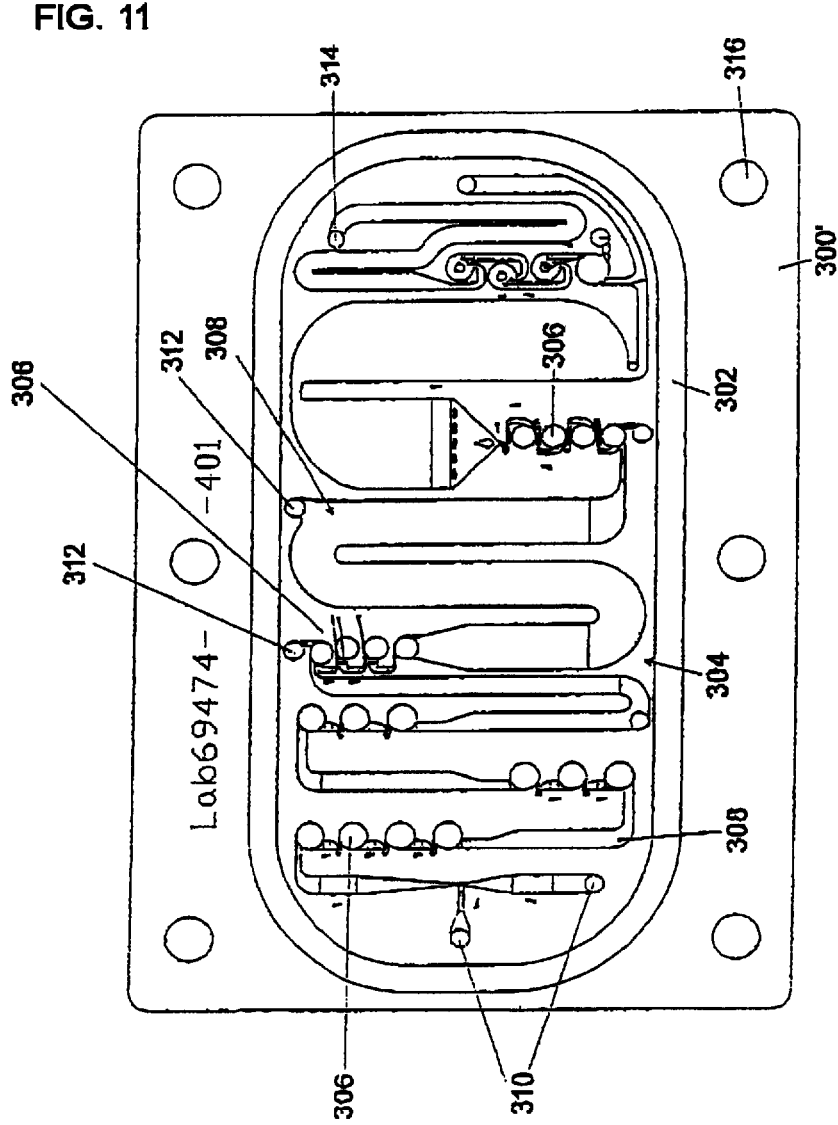
Figure 12:
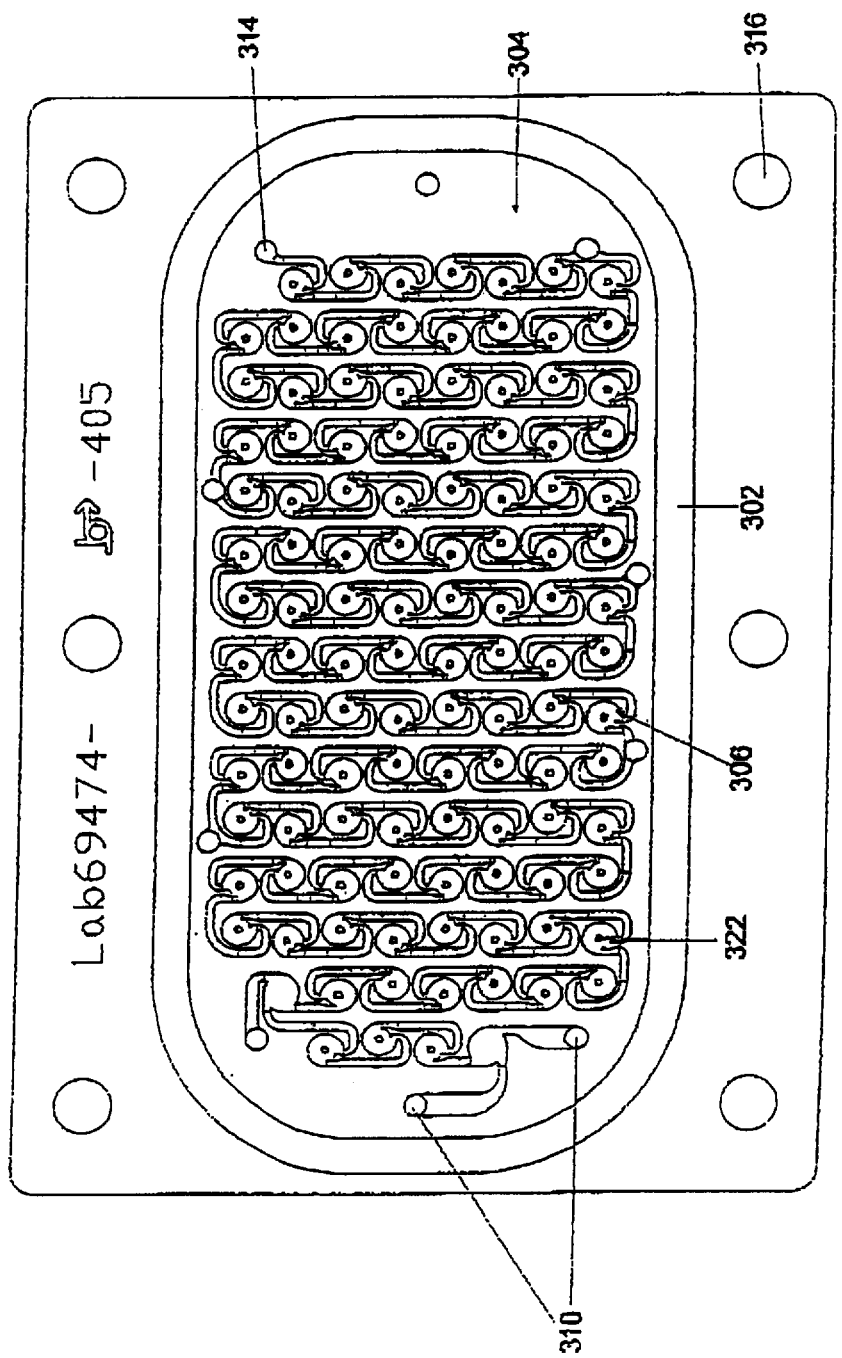

The process modules 300' shown in FIGS. 9 and 10 differ from those of FIGS. 6 to 8 and 11 to 15, in that there are integrated three independent process fluid channel systems 304-1 to 304-3 having each two inlet ports 310 and one outlet port 314. This allows a comparable study of different reactions or mixing effects. It should be noted that the process fluid channel system 304-1 has two mixing zones 306, whereas the process fluid channel systems 304-2 and 304-3 each have only one mixing zone 306.

Figure 16A:
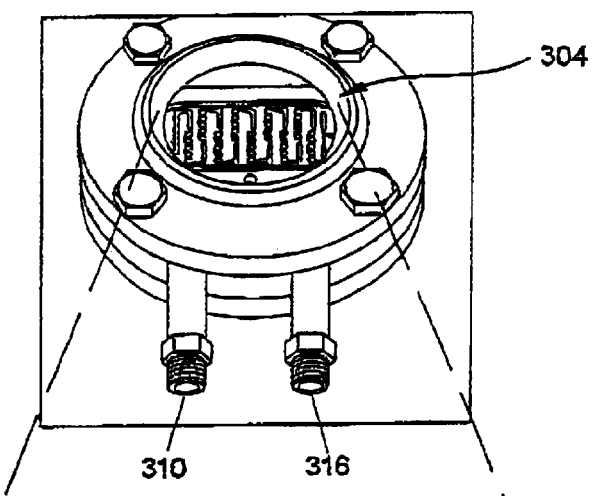
Figure 16B:
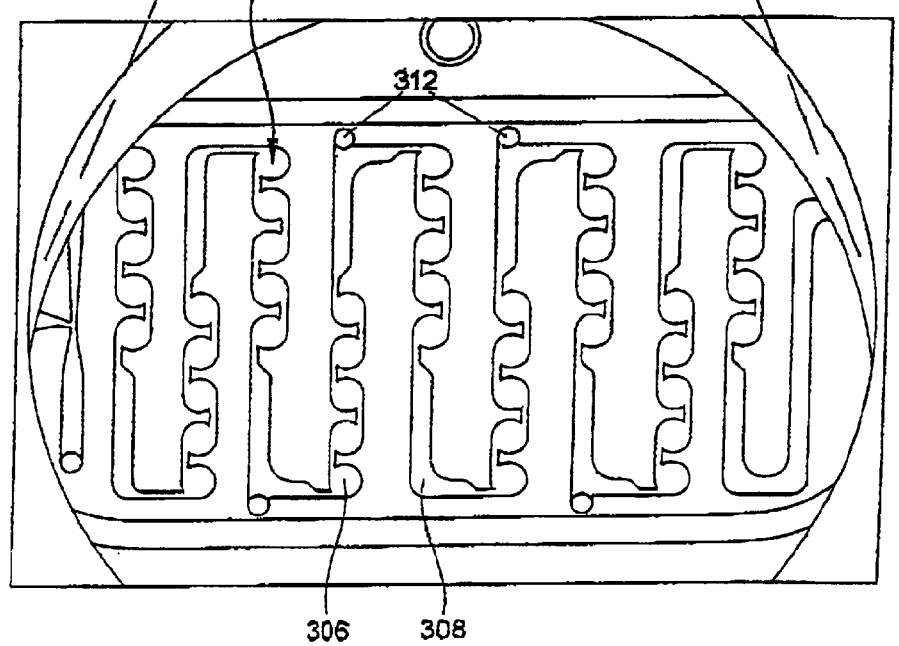
Figure 17:
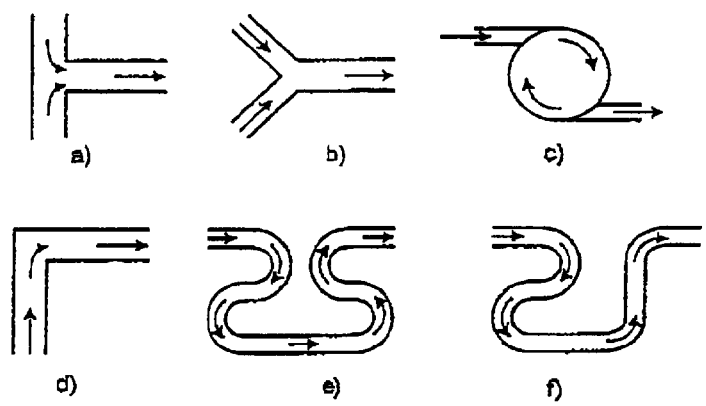
FIG. 17 schematical views of typical mixer types.

FIG. 17 shows exemplary various typical mixer element structures a) to f) termed phenomenologically in view of their appearance as T-contactor, Y-contactor, tangential mixer, bend, SZ-mixer, and LZ-mixer, respectively. These structures are recognizable in the variations shown in FIGS. 6 to 16.

In the following, specific details of the various flow-channel systems are described with respect to some of the figures.

FIG. 8 shows three different types of mixing zones 306 (from left to right): (i) a longer followed by a shorter tangential zone, a straight LZ zone, and a generally U-shaped SZ zone. In addition, on some locations beside the flow-channel in FIG. 8, there are shown small "ramps" 320 indicating a deviation of the pure two-dimensional structure the process fluid channel system is laid out, i. e. an inclination within the respective channel, where the direction of inclination corresponds to the orientation of the ramps 320.

Another detail is shown in section 304-1 of FIG. 10. The mixing zone 306 left comprises projections 322 essentially in the middle of each of the four tangential mixers it is composed of. Similar projections are, for example, also depicted in FIG. 10. The projections 322 enhance the swirling efficacy. This process module also shows the above mentioned ramps.

Figure 13:
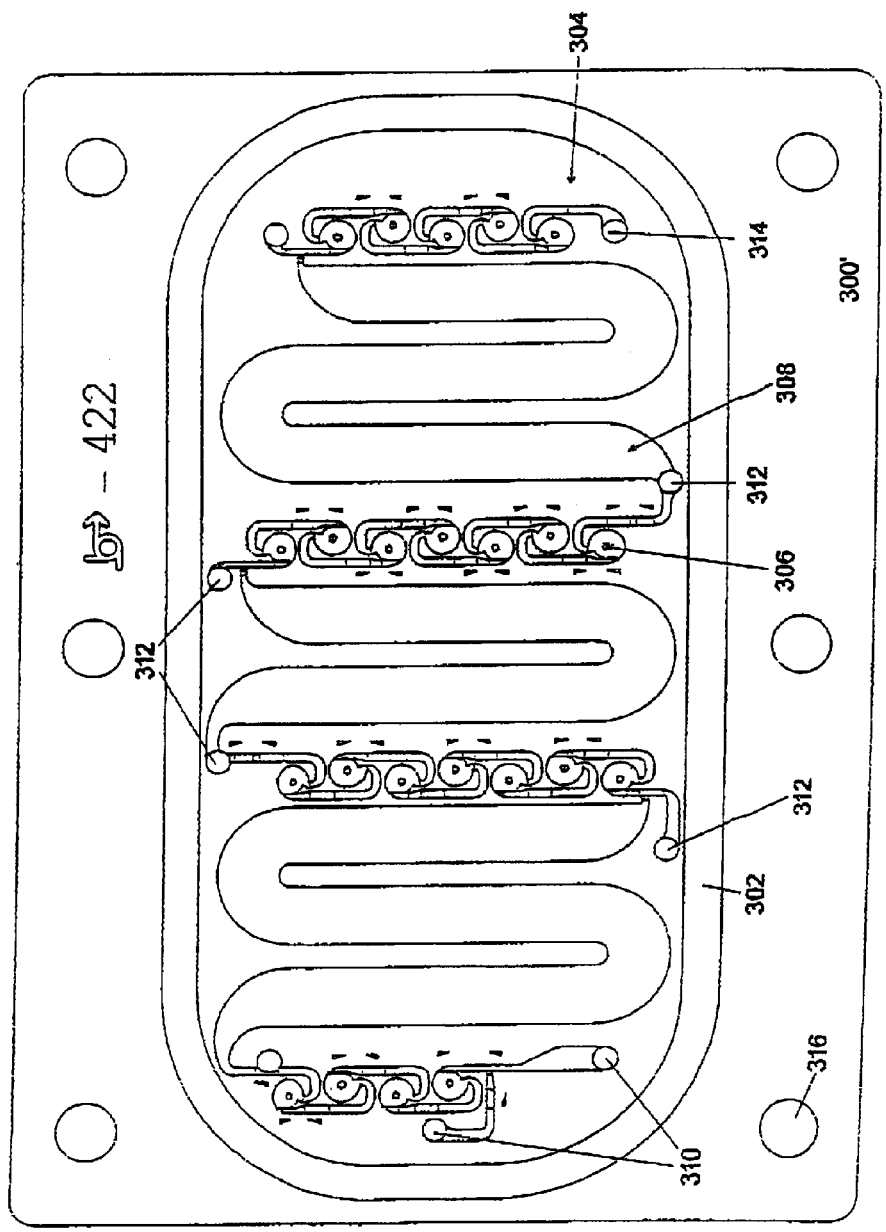
Figure 14:
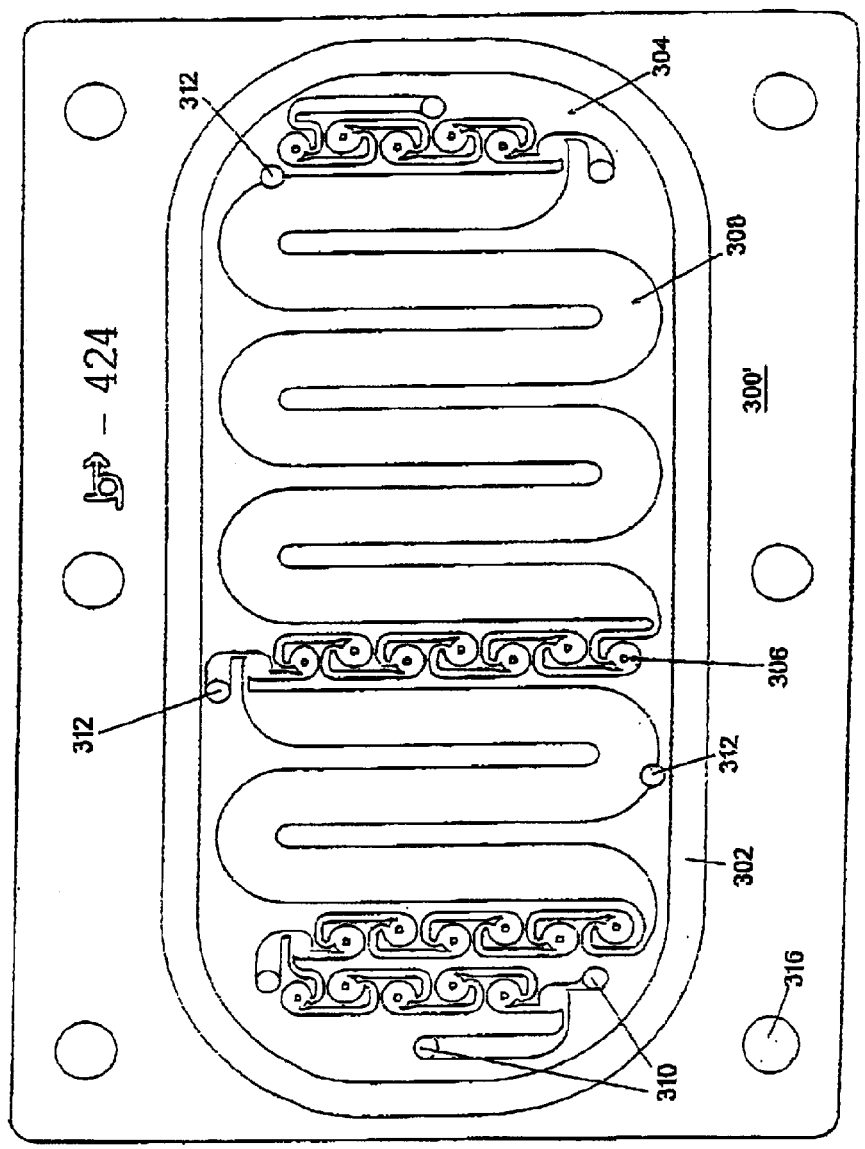
Figure 15:
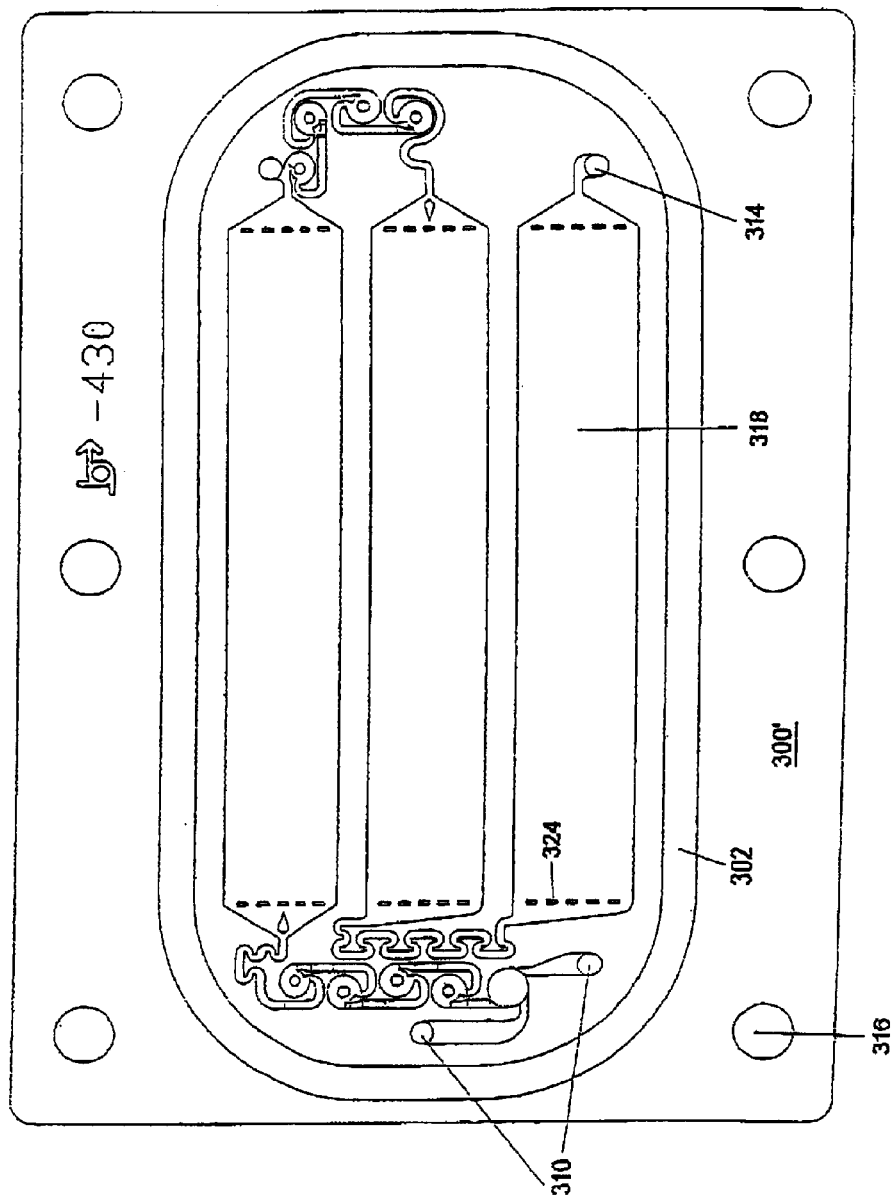

It should be noted that the above cited 3D structure of the process fluid channel system 304 is also noticeable from the constriction or narrowing of the channel at the entrance of a tangential mixer, which is shown in FIG. 13, for example, and is lacking in FIG. 10. A combination thereof is shown in FIG. 15 in the mixer at the right side, where in the flow direction, which is within this mixer the up-down-direction, the mixer combination is 2D-3D-2D-3D.

FIG. 13 shows the use of catalytic substances within what are called here catalytic flow-channels 318, that is flow-channels of the process fluid channel system 304 that contain, e. g. in the form of a coating, catalytic substances over which the reactants/product(s) flow. This means that the catalytic substances are part of the process module body. Barriers 324 prevent parts of the catalytic substances to enter the process fluid channel system.

Also important to note is the inlet and outlet direction into and out off the mixer, respectively, which can be either equivalent or different resulting in different mixing degrees.

Comparing FIGS. 6 to 15, it is evident that length, width, course, arrangement etc. of the process fluid channel system 304 may be varied independently, so that the process fluid channel system 304 may be adapted optimally.

FIGS. 16A and 16B schematic perspective views of the assembled micro-reactor according to the present invention, wherein FIG. 16B shows an enlarged view of the process fluid channel system visible in FIG. 16A through the second frame means.

Specifically, FIG. 16B shows a structure schematically shown in FIG. 5. Clearly visible are the flow-channel system 304 including mixing zones 306, retention zones 308, and the secondary inlet ports 312. Sticking out from below in FIG. 16A are the primary inlet and outlet ports 310, 316 that connect the micro-reactor with a pump and a suitable product vessel, respectively.

As for the materials used in the first and second embodiments, it should be noted that generally, the material for the process module is a rigid material in order to achieve a dimensional stability, and the material for the heat exchange module is either rigid or ductile, preferably stainless steel. Examples for the rigid materials used for the process module are: stainless steel, hastelloy and other nickel alloys, tungsten, tantalum, titanium, ceramics, graphite, fused silica ware (hazy, translucent or coloured), examples for the ductile materials for the heat exchange module are polymers, aluminum, aluminum alloys, copper, copper alloys, silver and silver alloys, preferably from aluminum or aluminum alloys. Examples for the rigid materials for the heat exchange module are stainless steel, hastelloy and other nickel alloys, or ceramics. As for the material used for the transparent cover-plate, these are preferably selected from the group consisting of polymer, silica glass, quartz glass, or fused silica. It should be noted that all surfaces, even the glass surfaces, are lapped to have a surface roughness in the order of 1 μm.

Figure 18:
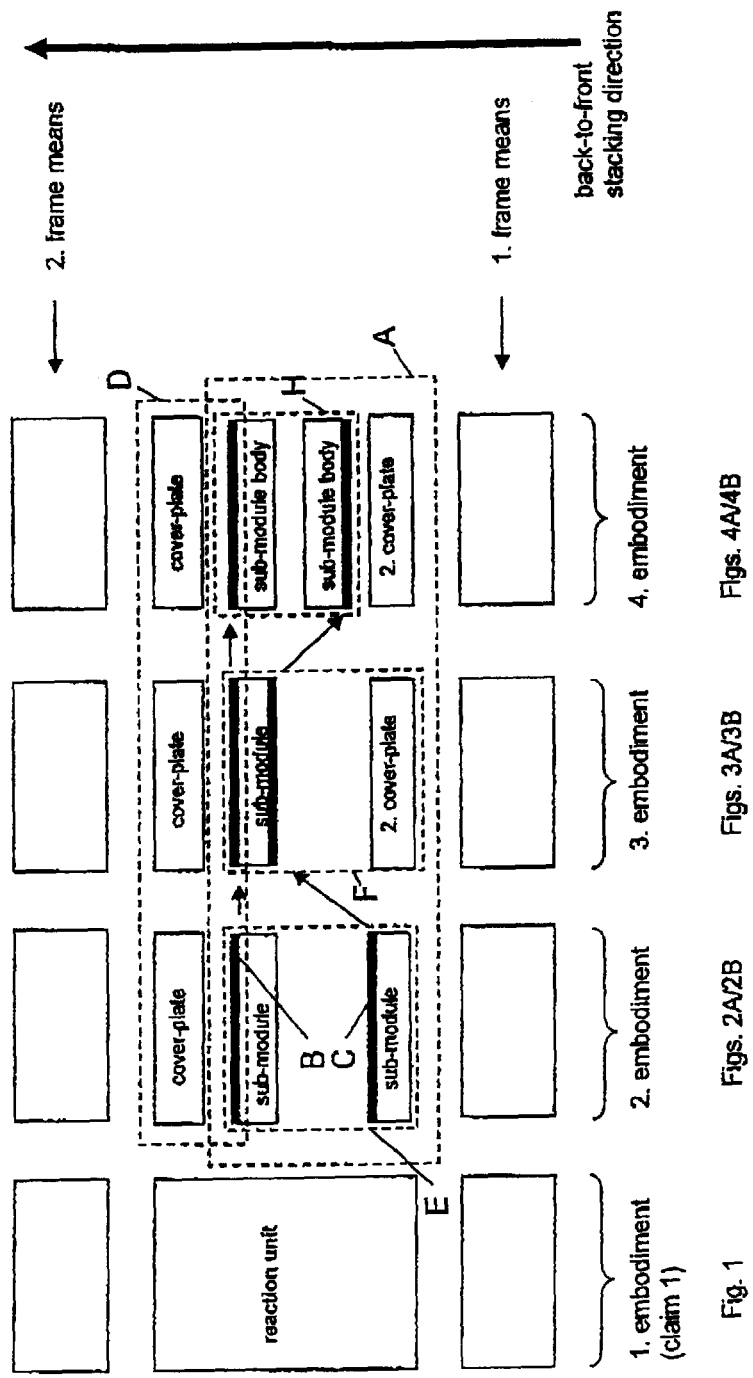
FIG. 18 a drawing visualizing main aspects of the present invention as defined in some of the claims.

FIG. 18 shows a schematic drawing visualizing the first to fourth embodiment and the corresponding figures. Furthermore, in order to alleviate the understanding of the basic claim structure, some features defined in the claims are shown as dashed-line squares. Specifically:
(i) The first to fourth columns represent the first to fourth embodiments, respectively.
(ii) The reaction unit comprises the cover-plate and the process and heat exchange module (→A) in the $2^{nd}$ to $4^{th}$ embodiments.
(iii) is the process fluid channel system, and C is the heat exchange fluid channel system.
(iv) D is the feature defined in claim 2, E is the feature as defined in claim 3, F is the feature as defined in claim 5, and G is the feature as defined in claim 6.

LIST OF REFERENCE NUMERALS

10 Continuous reaction micro-reactor
100 First frame means
104 Threaded holes
106 Rectangular recess
200 Second frame means
203 Circular opening
204 Through holes
206 Bolts
300(') Process sub-module
302 Annular groove
304 Process fluid channel system
306 Mixing zone
308 Retention zone
310 Primary inlet ports
312 Secondary inlet ports
314 Outlet port
316 Bores
318 Catalytic flow-channels
320 Ramps
322 Projections
324 Barriers
400 Heat exchange sub-module
402 Annular groove
404 Heat exchange fluid channel system
416 Bores
500 Cover-plate
502 Holes
600 Cover-plate
700 Process and heat exchange sub-module
800 Second cover-plate
A, B Orientations of 300
P Products
R Reactants
RU Reaction unit
S Stacking axis

The invention claimed is:
1. A continuous reaction micro-reactor of modular structure comprising, arranged along a back-to-front stacking axis thereof, a first frame means, a reaction unit, and a second frame means, wherein:
said reaction unit comprises a process fluid channel system for continuous reaction of a plurality of feeds or reactants flowing into said reaction unit to form at least one product flowing out of said reaction unit, a heat exchange fluid channel system for adjusting the temperature environment of said process fluid channel system and a transparent cover plate;
said first and second frame means are each formed as a flange;
said first and second frame means are pressed towards each other by a plurality of tensioning means arranged along and within an outer circumference of said first and second frame means;
said second frame means is configured to allow the process fluid channel system to be inspected via the cover-plate being transparent;
said reaction unit can separately be exchanged to adapt it to multifarious technological problems to be investigated and solved; and
said process fluid channel system comprises a micro-structure formed into a reaction surface of said reaction unit, said micro-structure comprising open grooves having a bottom defining a depth, the grooves forming the fluid channel system, wherein said open grooves are fluid-tightly covered by said cover plate, leaving inlet and outlet openings for the various feeds and products at side surfaces of the reaction unit.
2. The continuous reaction micro-reactor of claim 1, wherein:
said reaction unit comprises a plate-shaped process sub-module, a front surface of which having said process fluid channel system, and a plate-shaped heat exchange sub-module sandwiched between said process sub-module and said first frame means, and said heat exchange fluid channel system comprises a micro-structure formed into a front surface of said heat exchange sub-module and covered by a back surface of said process sub-module in a manner to seal said heat exchange fluid channel system.

3. The continuous reaction micro-reactor of claim 2, wherein said heat exchange sub-module and said first frame means are made of one part.

4. The continuous reaction micro-reactor of claim 1, wherein:
said reaction unit comprises a plate-shaped process and heat exchange sub-module, a front surface of which having said process fluid channel system, and a second cover-plate sandwiched between said process and heat exchange sub-module and said first frame means, and
said heat exchange fluid channel system comprises a micro-structure formed into a back surface of said heat exchange sub-module and covered by said second cover-plate in a manner to seal said heat exchange fluid channel system.

5. The continuous reaction micro-reactor of claim 4, wherein said process and heat exchange sub-module is divided by a plane perpendicular to said stacking axis into a first plate-shaped sub-module body including said process fluid channel system and a second plate-shaped sub-module body including said heat exchange channel system.

6. The continuous reaction micro-reactor of claim 4, wherein said second cover-plate and said first frame means are made of one part.

7. The continuous reaction micro-reactor of claim 1, wherein said second frame means is configured such as to allow an external fluid connection of said cover-plate through the second frame means to serve as a fluid inlet means for said process fluid channel system.

8. The continuous reaction micro-reactor according to claim 1, wherein the surface of said cover-plate directly covering said process fluid channel system carries a catalytic coating.

9. The continuous reaction micro-reactor according to claim 1, wherein said reaction unit has a plurality of primary inlet ports for a plurality of primary feeds flowing into said process fluid channel system, and at least one secondary inlet port provided after said plurality of primary inlet ports in a flow direction for at least one secondary feed flowing into said process fluid channel system.

10. The continuous reaction micro-reactor according to claim 9, wherein said primary and/or secondary inlet ports are arranged on side surfaces and/or on front and back surfaces of the reaction unit.

11. The continuous reaction micro-reactor according to claim 1, wherein said process fluid channel system and/or said heat exchange fluid channel system are/is formed in a meandered fashion.

12. The continuous reaction micro-reactor according to claim 1, wherein said process fluid channel system comprises, consecutively arranged in a flow direction of said primary feeds flowing through it, at least one turbulent-flow mixing zone and at least one essentially laminar-flow retention zone.

13. The continuous reaction micro-reactor according to claim 1, wherein said first and second frame means have first and second positioning means, respectively, that define a position of said reaction unit relative to the stacking axis.

14. The continuous reaction micro-reactor according to claim 13, wherein said first and second positioning means are formed as recesses in surfaces of said first and second frame means, respectively, facing each other, wherein the inner circumferential shape of the recesses is commensurate to the outer circumferential shape of corresponding side of said reaction unit.

15. The continuous reaction micro-reactor according to claim 14, wherein said recesses forming said first and second positioning means are rectangular.

16. A continuous reaction micro-reactor of modular structure comprising:
a flange-shaped first frame means;
a heat exchange module comprising a plate having a major surface and a side surface, said plate having a heat exchange fluid channel system for adjusting the temperature environment of the micro-reactor, said heat exchange fluid channel system comprising an open groove formed in said major surface, said groove having a bottom defining a depth less than the thickness of said heat exchange module plate, said heat exchange fluid channel system further comprising at least one inlet disposed in said side surface of said plate for a heat exchange fluid flowing into said heat exchange module and at least one outlet for the heat exchange fluid flowing out of heat exchange module;
a process module arranged on the heat exchange module along a back-to-front stacking axis, said process module comprising a plate having a front-facing reaction surface and a micro-structure formed into said reaction surface, said micro structure comprising at least one open meandering groove, said meandering groove having a bottom defining a depth less than the thickness of said process module plate and forming a process fluid channel system for continuous reaction of a plurality of feeds or reactants flowing into said process module to form at least one product flowing out of said process module, said process module further including at least one inlet disposed on a side surface thereof for the plurality of feeds or reactants flowing into said process module and at least one outlet for the at least one product flowing out of said process module;
a transparent cover plate arranged on the process module along the back-to-front stacking axis, said transparent cover plate directly covering said at least one open meandering groove formed in said front-facing reaction surface of said process module plate in a manner to seal and close said process fluid channel system;
a flange-shaped second frame means arranged on the transparent cover plate along a back-to-front stacking axis, said second frame means having a viewing window configured to allow said process fluid channel system of said process module to be inspected through said transparent cover-plate; and
a plurality of tensioning means pressing said first and second frame means towards each other,
wherein said open groove forming said heat exchange fluid channel system of said heat exchange module is directly covered by either a front-facing surface of the first frame means or a rear-facing surface opposite said front-facing reaction surface of said process module plate in a manner to seal said heat exchange fluid channel system, and
wherein said heat exchange module and said process module are arranged on respective parallel planes perpendicular to said stacking axis, whereby said process module is separately exchangeable with other process modules, thereby adapting the continuous reaction micro-reactor to multifarious technological problems to be investigated and solved.

17. The continuous reaction micro-reactor of claim 16, wherein said heat exchange module and said first frame means are integrated into a single element forming one part.

18. The continuous reaction micro-reactor of claim 16, wherein said process module is plate-shaped, a front surface of which being said reaction surface, said plate-shaped process module being sandwiched between said heat exchange module and said transparent cover plate.

19. The continuous reaction micro-reactor of claim 16, wherein said heat exchange fluid channel system comprises a micro-structure formed into a front surface of said heat exchange module, said micro-structure being covered by a back surface of said process module in a manner to seal said heat exchange fluid channel system.

20. The continuous reaction micro-reactor of claim 16, further comprising a second cover plate sandwiched between said heat exchange module and said first frame means, and wherein said heat exchange fluid channel system comprises a micro-structure formed into a back surface of said heat exchange module, said micro-structure being covered by said second cover-plate in a manner to seal said heat exchange fluid channel system.

21. The continuous reaction micro-reactor of claim 20, wherein said second cover-plate and said first frame means are made of one part.

22. The continuous reaction micro-reactor of claim 16, wherein said second frame means is configured such as to allow an external fluid connection through the second frame means to serve as a fluid inlet means for said process fluid channel system.

23. The continuous reaction micro-reactor of claim 16, wherein the surface of said transparent cover-plate directly covering said process fluid channel system carries a catalytic coating.

24. The continuous reaction micro-reactor of claim 16, wherein said process module has a plurality of primary inlet ports for a plurality of primary feeds flowing into said process fluid channel system, and at least one secondary inlet port provided after said plurality of primary inlet ports in a flow direction for at least one secondary feed flowing into said process fluid channel system.

25. The continuous reaction micro-reactor according to claim 24, wherein said primary and/or secondary inlet ports are arranged on side surfaces and/or on front and back surfaces of the process module.

26. The continuous reaction micro-reactor according to claim 16, wherein said process fluid channel system and/or said heat exchange fluid channel system are/is formed in a meandered fashion.

27. The continuous reaction micro-reactor according to claim 16, wherein said process fluid channel system comprises, consecutively arranged in a flow direction of said primary feeds flowing through it, at least one turbulent-flow mixing zone and at least one essentially laminar-flow retention zone.

28. The continuous reaction micro-reactor according to claim 16, wherein said first and second frame means have first and second positioning means, respectively, that define a position of said reaction unit relative to the stacking axis.

29. The continuous reaction micro-reactor according to claim 28, wherein said first and second positioning means are formed as recesses in surfaces of said first and second frame means, respectively, facing each other, wherein recesses are formed with a bottom surface bounded by a perpendicular side wall, the bottom surface supporting a corresponding process module or heat exchange module, and the side wall defining the inner circumferential shape of the recesses commensurate to the outer circumferential shape of a corresponding process module or heat exchange module.

30. The continuous reaction micro-reactor according to claim 29, wherein said recesses forming said first and second positioning means are rectangular.

\* \* \* \* \*